April 26, 1949.  F. G. SCHWEISTHAL  2,468,690
PORTABLE STROBOSCOPE HAVING PISTOL-LIKE
FRAME AND INDICATOR LOCK
Filed Nov. 26, 1943  9 Sheets-Sheet 1
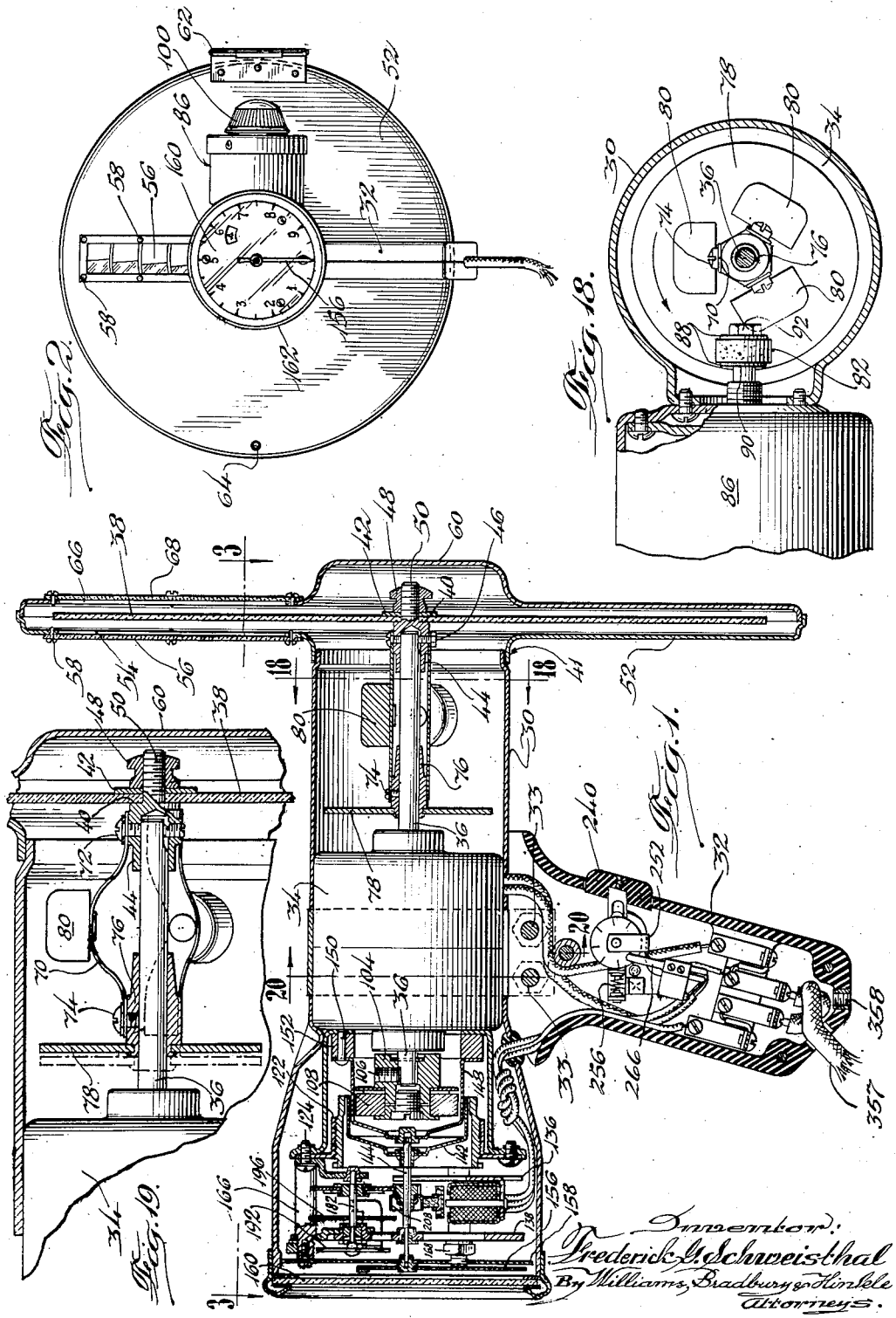

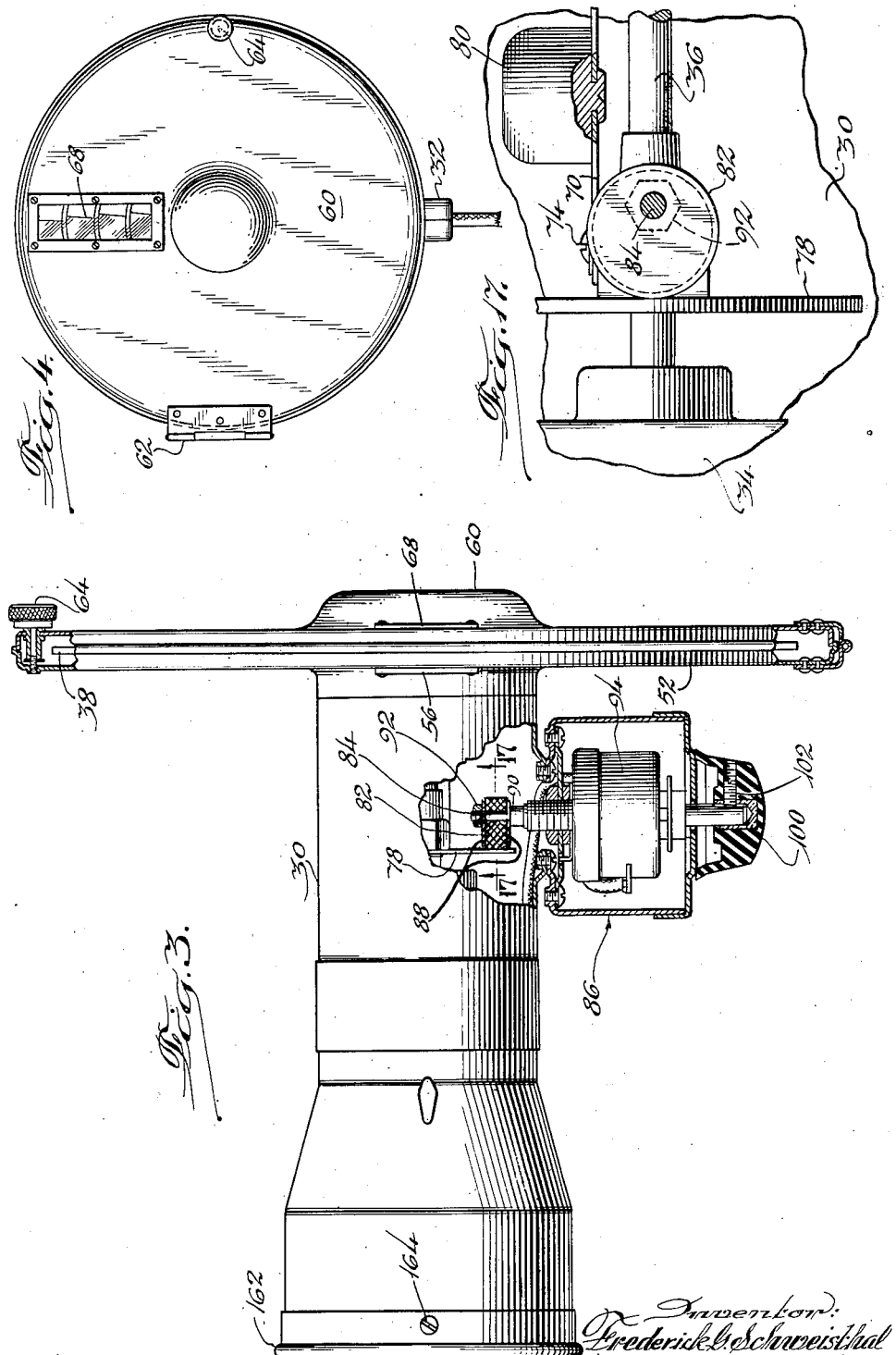

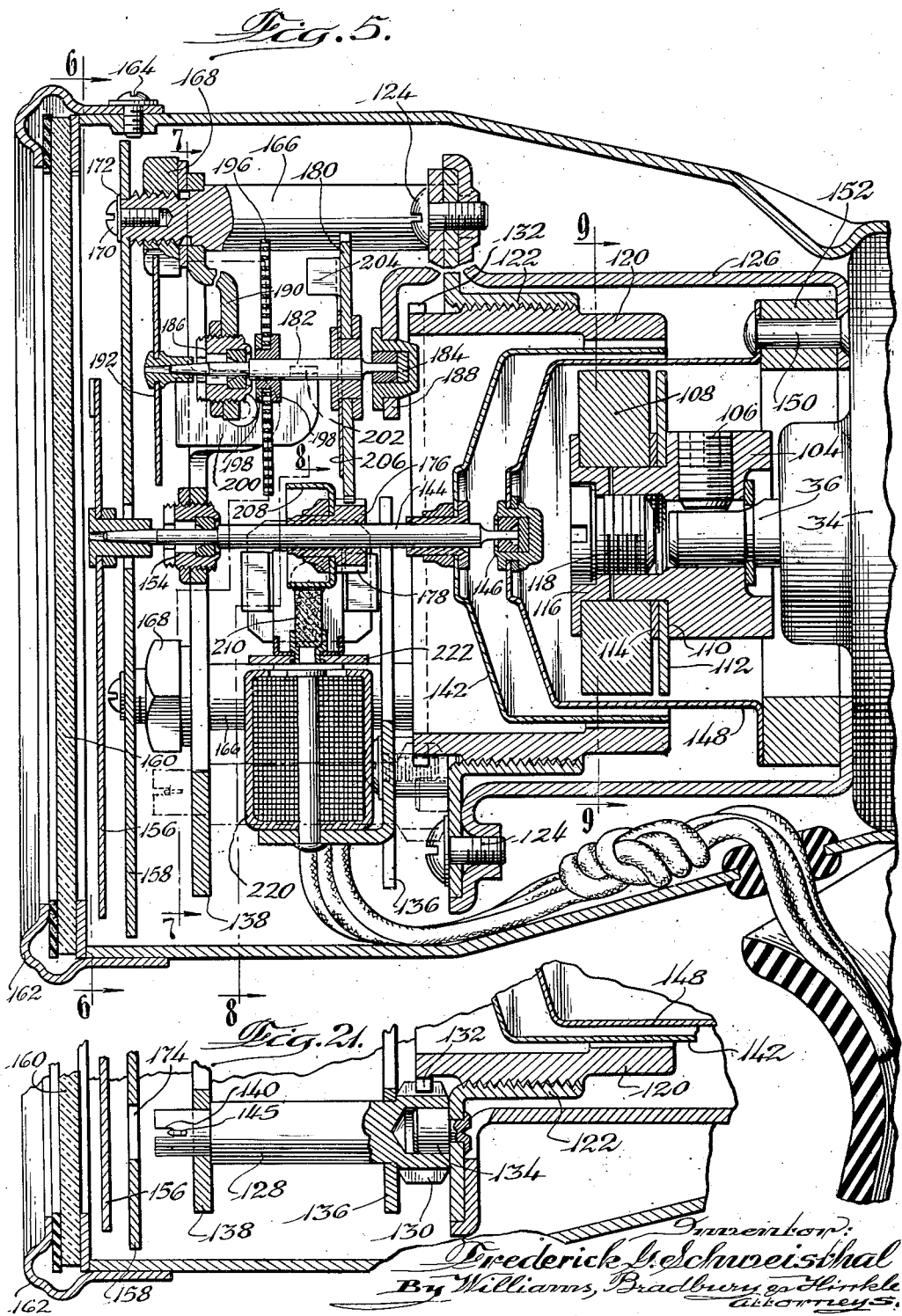

April 26, 1949.                F. G. SCHWEISTHAL                2,468,690
                        PORTABLE STROBOSCOPE HAVING PISTOL-LIKE
                                FRAME AND INDICATOR LOCK
Filed Nov. 26, 1943                                         9 Sheets-Sheet 4
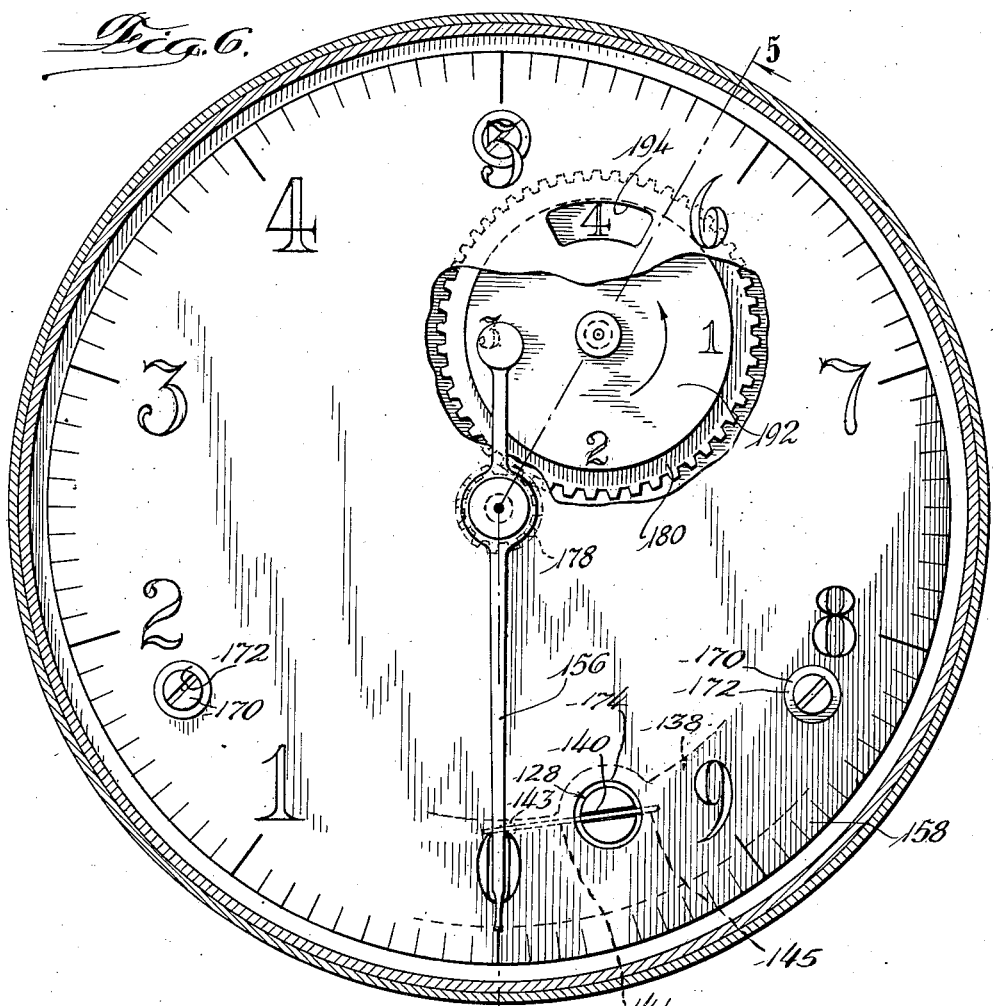
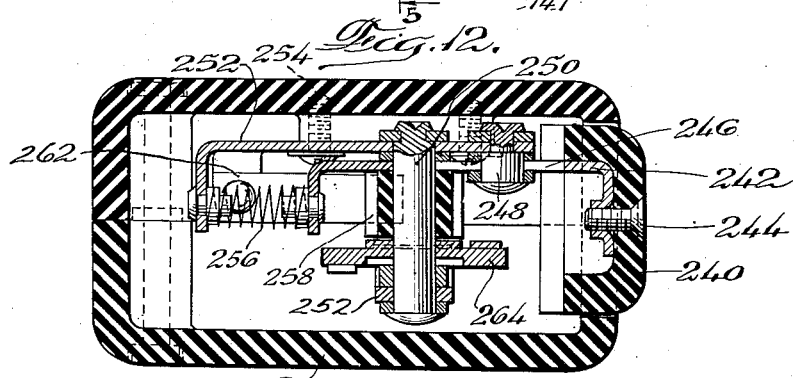

April 26, 1949.  F. G. SCHWEISTHAL  2,468,690
PORTABLE STROBOSCOPE HAVING PISTOL-LIKE
FRAME AND INDICATOR LOCK
Filed Nov. 26, 1943  9 Sheets-Sheet 5
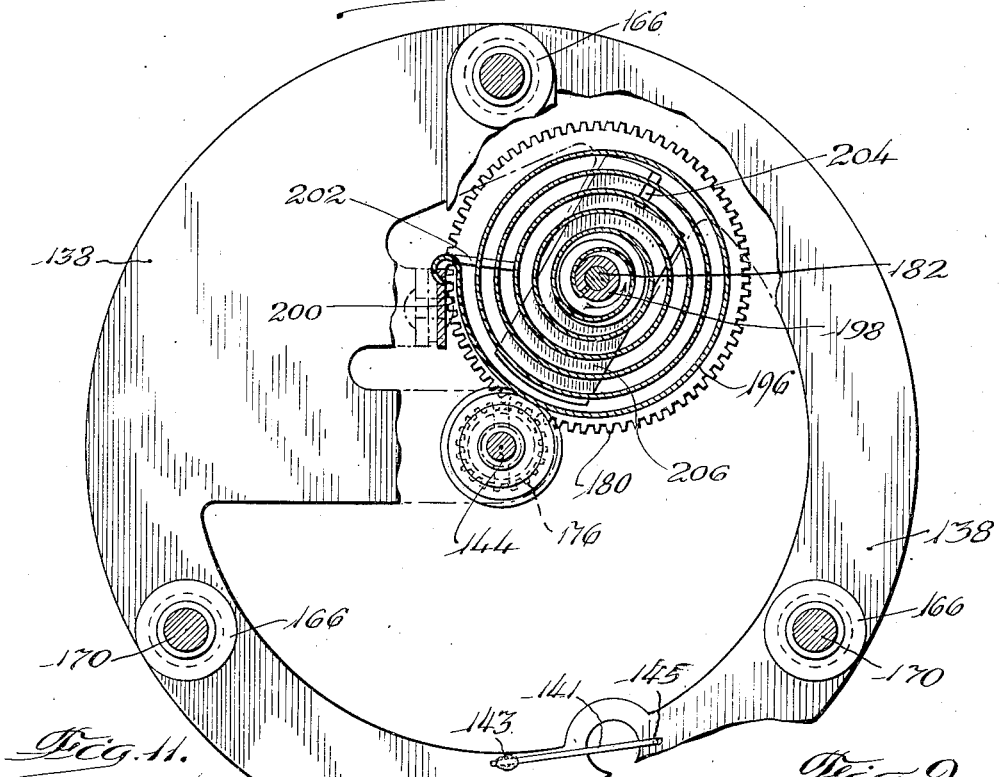
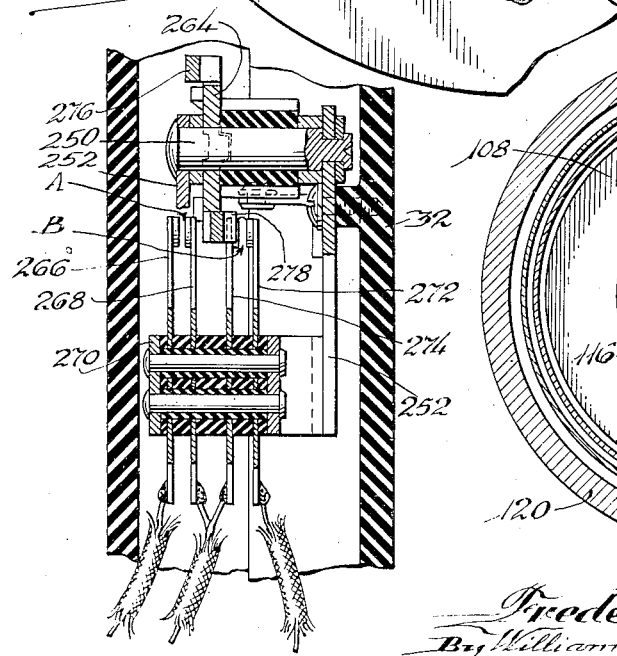
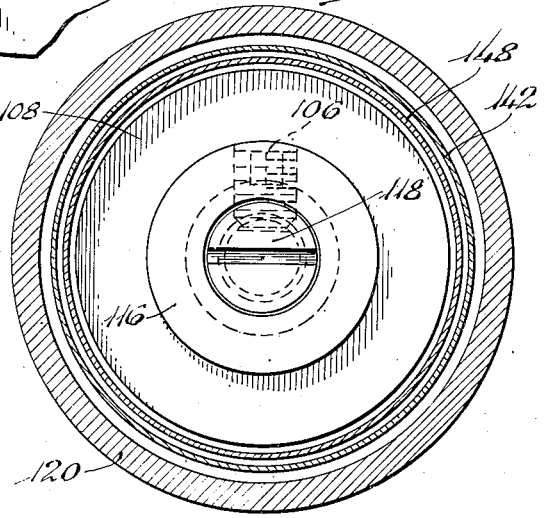
Inventor:
Frederick G. Schweisthal
By Williams, Bradbury & Hinkle
Attorneys

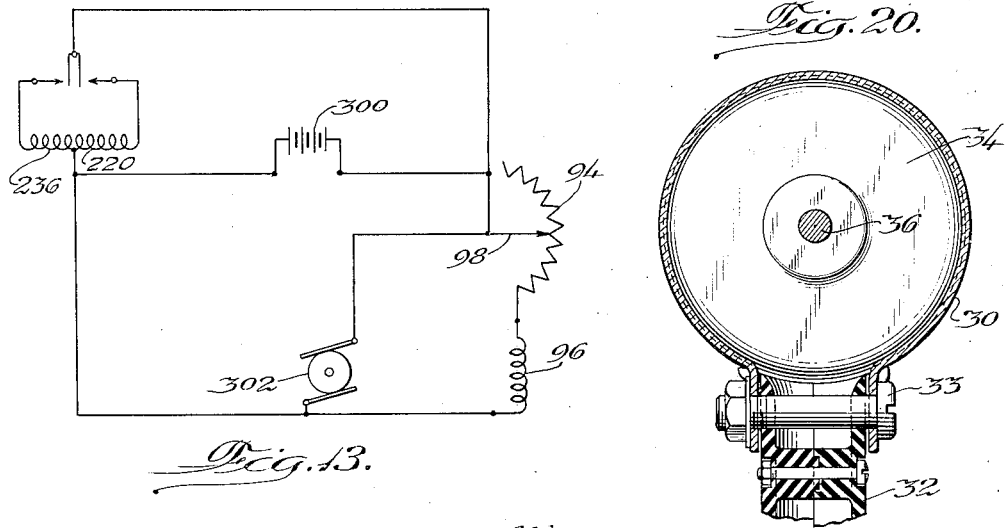
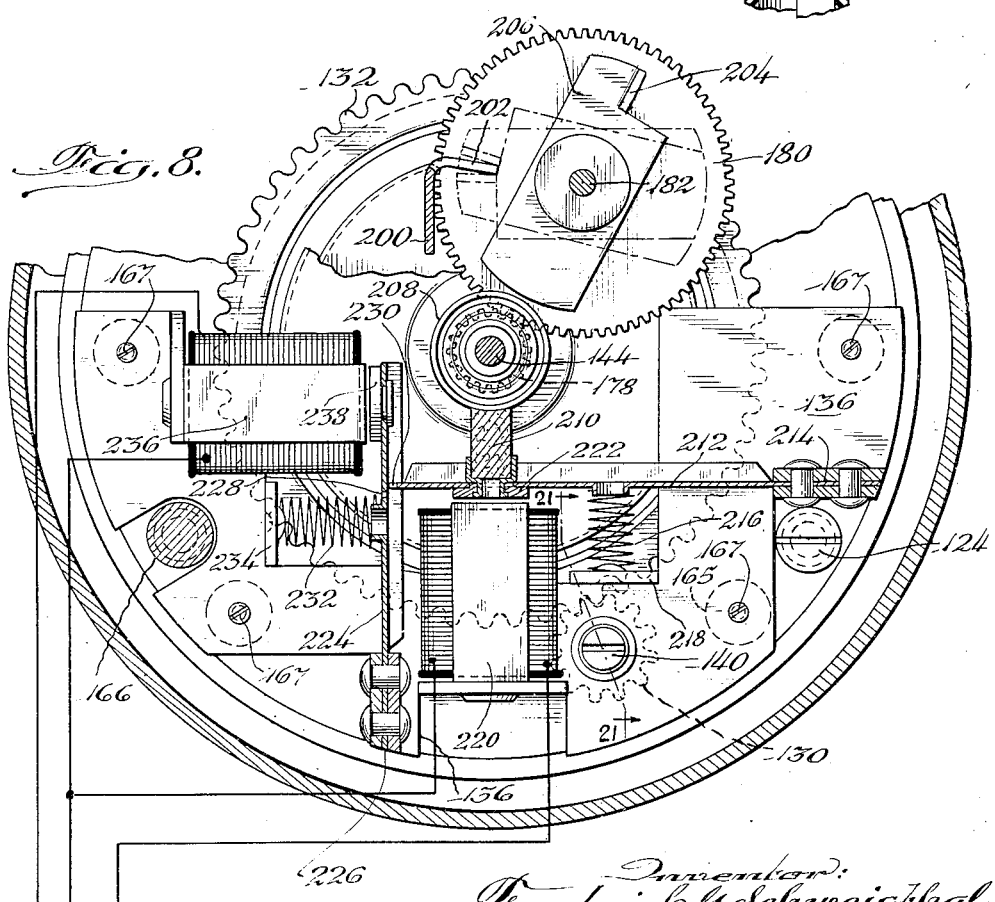

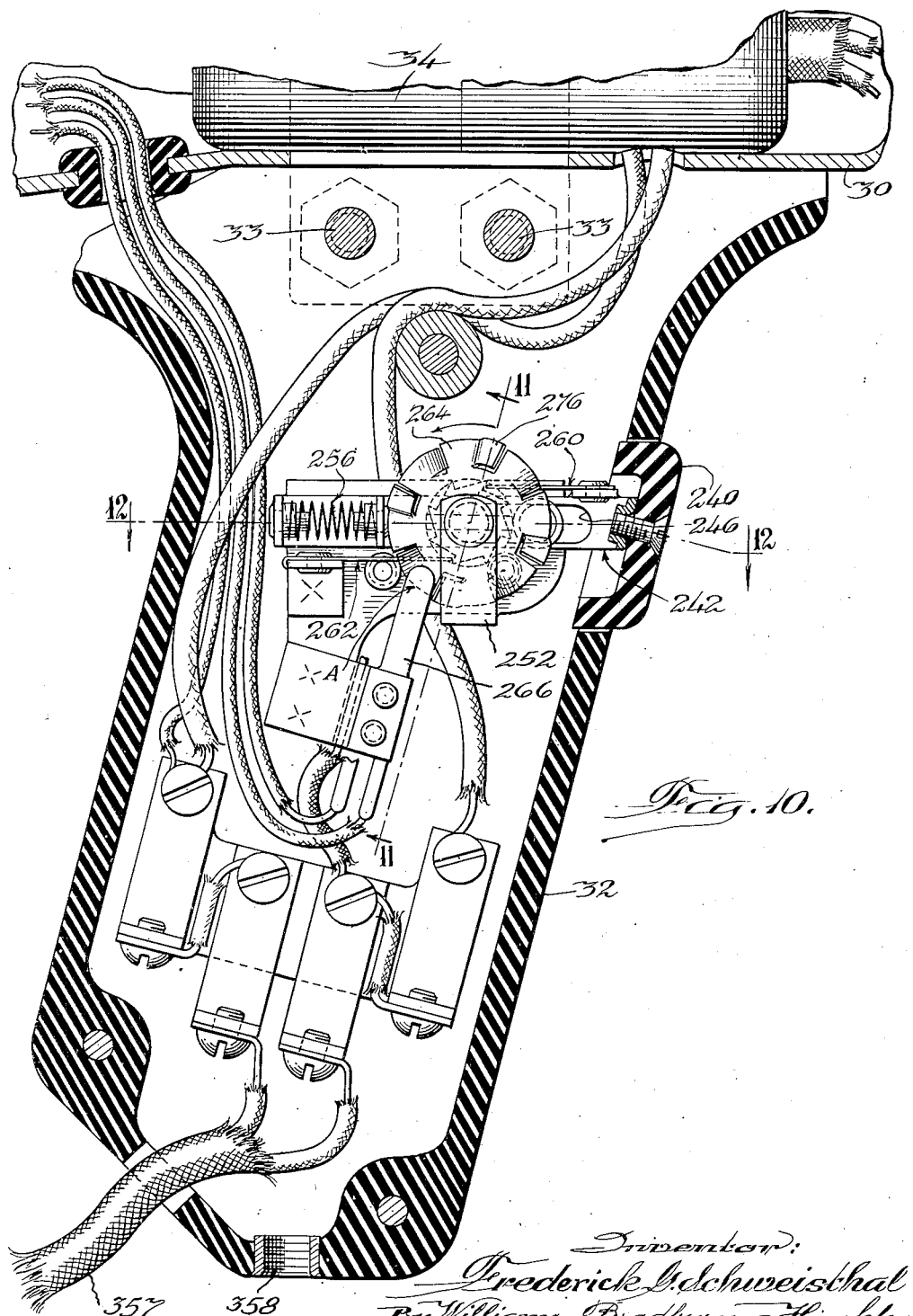

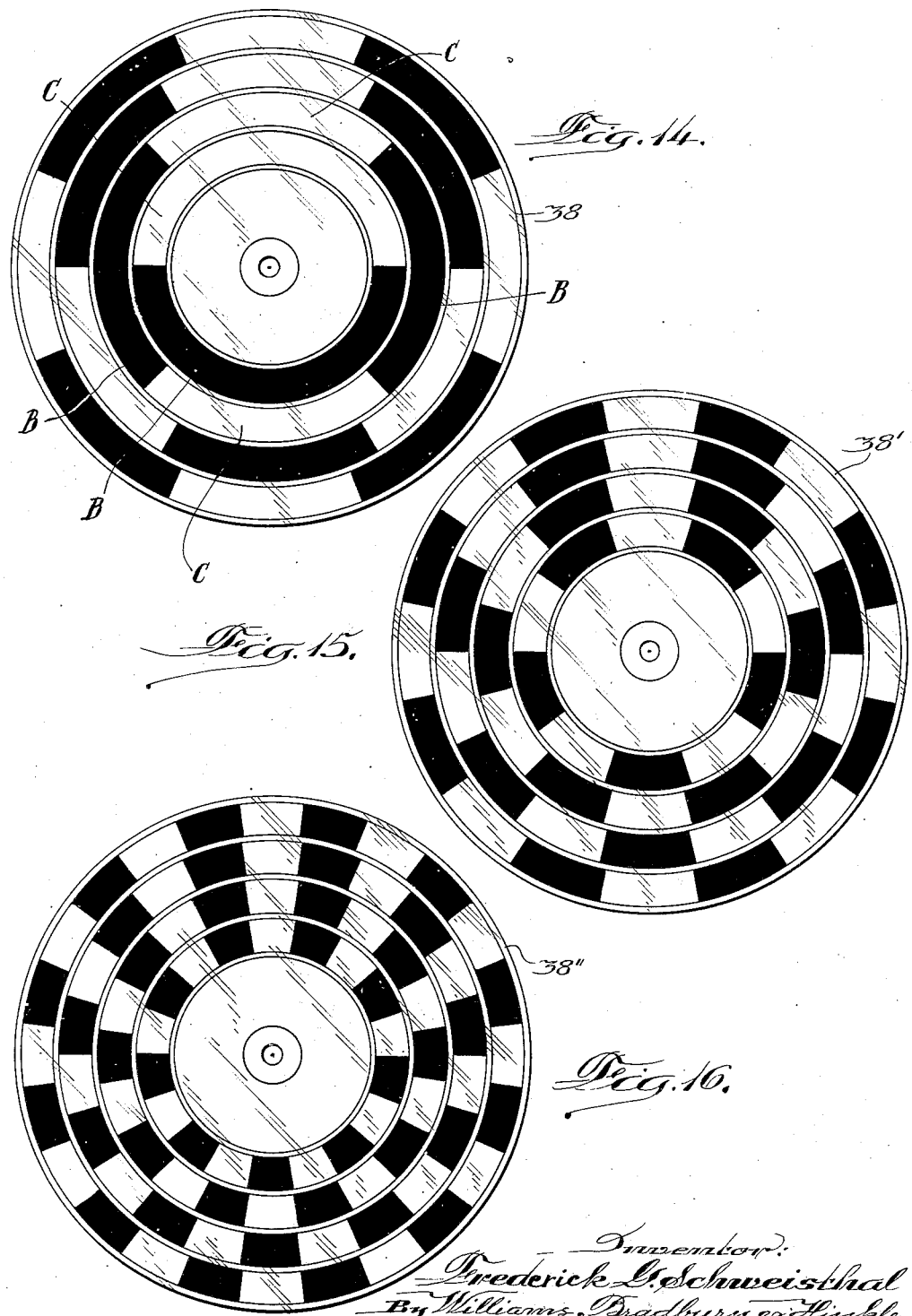

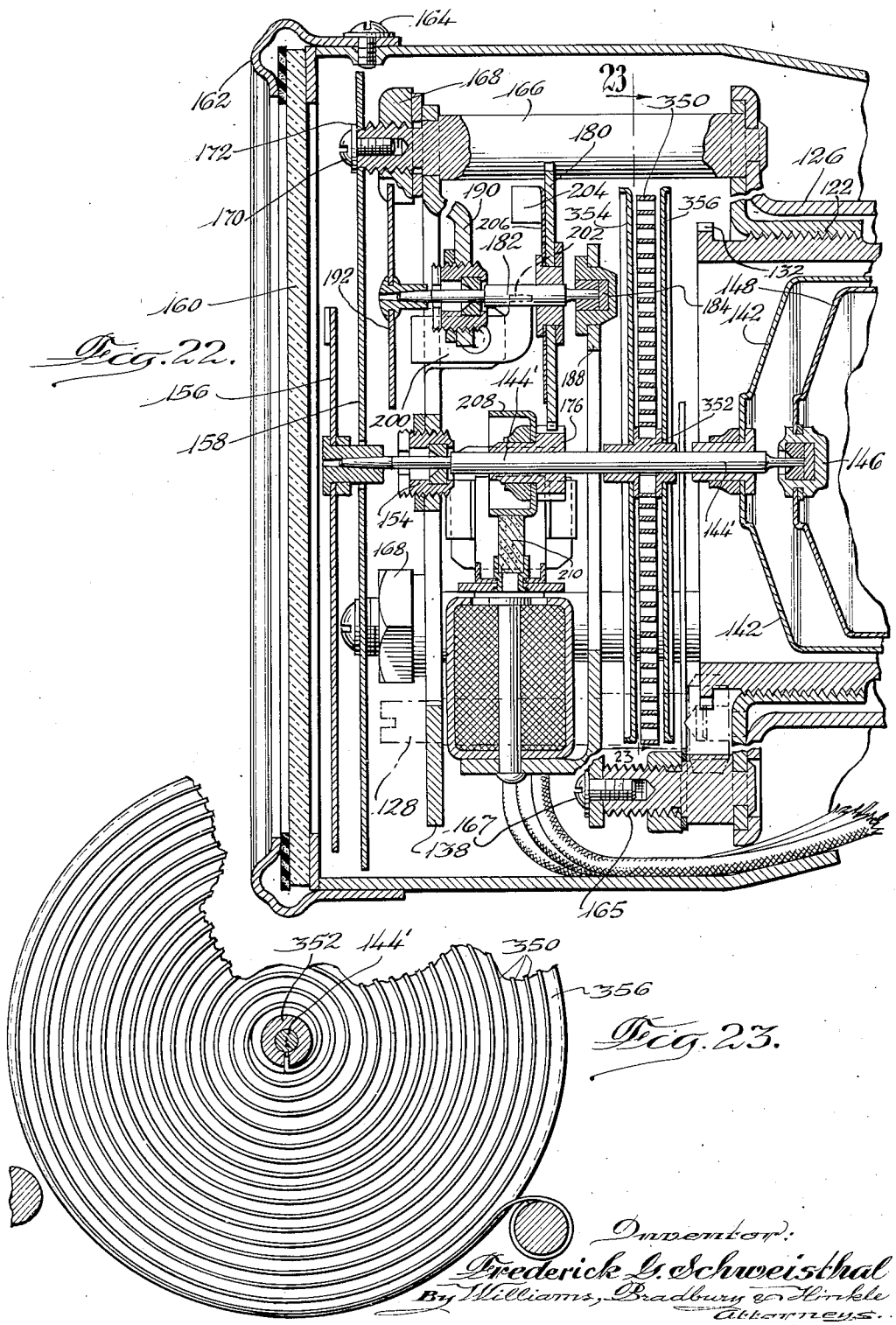

Patented Apr. 26, 1949

2,468,690

UNITED STATES PATENT OFFICE 2,468,690

PORTABLE STROBOSCOPE HAVING PISTOL-LIKE FRAME AND INDICATOR LOCK

Frederick G. Schweisthal, Skokie, Ill., assignor to Stewart-Warner Corporation, Chicago, Ill., a corporation of Virginia Application November 26, 1943, Serial No. 511,885

11 Claims. (Cl. 88—14)

1

My invention relates to portable stroboscopes and is more particularly concerned with a portable stroboscope especially adapted to indicate the speed of a shaft or other moving part.

An object of my invention is to provide a portable stroboscope which may be connected to a battery carried by the user and which can readily be moved from place to place to indicate the speed of shafts or other rotating parts of machinery.

Another object of my invention is to provide a portable stroboscope having new and improved speed indicating means.

Another object of my invention is to provide a portable stroboscope having new and improved speed control mechanism.

Another object of my invention is to provide a portable stroboscope having new and improved switch mechanism.

Another object of my invention is to provide a portable stroboscope having new and improved viewing mechanism.

Another object of my invention is to provide a new and improved portable stroboscope which is light in weight, compact, inexpensive to manufacture, easy to operate, and capable of giving long and troublefree service.

Another object of my invention is to provide a portable stroboscope which may be readily adapted to indicate the speed of machine parts operating at widely different speeds.

Other objects of my invention will become apparent as the description proceeds.

In the drawings:

Fig. 1 is a longitudinal, sectional view of a preferred embodiment of my invention;

Fig. 2 is an end view taken from the left of Fig. 1;

Fig. 3 is a top plan view with parts cut away to show details of construction;

Fig. 4 is an end view looking toward the left in Fig. 1;

Fig. 5 is an enlarged, longitudinal sectional view of the lefthand end of Fig. 1;

Fig. 6 is a transverse section taken on the line 6—6 of Fig. 5, but showing parts of the main dial broken away to disclose the structure therebeneath;

Fig. 7 is an irregular, transverse section taken on the line 7—7 of Fig. 5;

Fig. 8 is an irregular, partial, transverse section taken on the line 8—8 of Fig. 5;

Fig. 9 is an irregular, transverse section taken on the line 9—9 of Fig. 5;

2

Fig. 10 is an enlarged, sectional view of the handle and associated mechanism;

Fig. 11 is a partial section taken on the line 11—11 of Fig. 10 showing the switch mechanism;

Fig. 12 is a transverse section through the handle taken on the line 12—12 of Fig. 10;

Fig. 13 is a wiring diagram;

Figs. 14, 15 and 16 are views showing different types of scanning discs;

Fig. 17 is a sectional view taken on the line 17—17 of Fig. 3 showing a detail of the speed governor;

Fig. 18 is a transverse section taken on the line 18—18 of Fig. 1;

Fig. 19 is a view showing the governing mechanism in expanded position;

Fig. 20 is an irregular, transverse section taken on the line 20—20 of Fig. 1;

Fig. 21 is a section taken on the line 21—21 of Fig. 8;

Fig. 22 is a view similar to Fig. 5, but showing a modified form of my invention;

Fig. 23 is a transverse section taken on the line 23—23 of Fig. 22.

The embodiment shown in Figs. 1 to 21, inclusive, comprises a generally cylindrical housing 30 formed of sheet metal or other suitable material and provided with a pistol-like grip 32 whereby the stroboscope may be readily carried in one hand of the user and pointed toward the object whose speed is to be determined. The two-piece grip is secured to the housing 30 by bolts 33 (Figs. 10 and 20). An electric motor 34 is mounted in the housing 30 and drives a shaft 36 which rotates a scanning disc 38. This scanning disc is removably clamped between the shoulder 40 and a washer 42. The shoulder 40 is provided by a collar 44 which is attached to the shaft 36 for rotation therewith by means of a screw 46. The washer 42 is held against one side of the disc 38 by a nut 48 removably threaded to the reduced extension 50 of the collar 44.

A scanning disc 38 is shown in Fig. 14 and comprises four sets of circular viewing bands, each band being composed of alternate clear segments or windows of arcuate conformation and opaque segments likewise of arcuate conformation. In Fig. 14 the inner band is illustrated as having a single window indicated by the letter C and a single opaque segment indicated by the letter B. The adjacent band comprises a pair of windows and a pair of alternating opaque segments, whereas the third band has three windows and three opaque segments, and the fourth or outer band has four windows and four opaque segments. The disc 38 may be made of any suitable materials and in any suitable manner but is preferably formed of transparent plastic or other suitable material and painted black to provide the opaque segments.

In Fig. 15 I have shown an alternative scanning disc 38' likewise having four viewing bands but wherein the innermost band has five windows and five opaque segments, the next band six windows and six opaque segments, the next seven windows and seven opaque segments, and the outermost band eight windows and eight opaque segments. In Fig. 16, a third scanning disc 38'' has an innermost viewing band containing nine windows and nine opaque segments, an adjacent band containing ten windows and ten opaque segments, a third band containing eleven windows and eleven opaque segments, and a fourth or outer band containing twelve windows and twelve opaque segments. It is to be understood that either the disc 38' or the disc 38'' may be substituted for the disc 38 to adapt the stroboscope for use with machine parts operating in widely different speed ranges.

The right-hand end of the tubular housing 30 is provided with a radially extending flange 52 having an oblong opening 54 formed therein and provided with a strip 56 of transparent plastic or other material covering this opening and secured to the flange 52 by screws 58 or in any other suitable manner. A door or cover 60 has one edge pivotally attached to the flange 52 by a hinge 62, and the opposite edge of the cover 60 is provided with a suitable latch 64 for securing the cover in closed position. As best shown in Fig. 3, this latch may be a thumb screw or any other suitable device for holding the cover in closed position while the stroboscope is in use, but which permits the cover to be readily swung to open position to change viewing discs to adapt the stroboscope for use with parts operating at a speed outside of the speed range of the particular disc theretofore in use. The cover 60 is provided with an opening 66 which registers with the opening 54 when the cover is in closed position, and a strip 68 of suitable transparent material is attached to the cover and closes the opening 66.

A centrifugal governor is mounted on the shaft 36 for rotation therewith and comprises three resilient strips 70, each having one end secured to the fixed collar 44 by means of a screw 72. The other end of each strip 70 is secured by a screw 74 to a second collar 76 which is slidable lengthwise of the shaft 36 and carries a brake disc 78. A weight 80 is attached to the center of each strip 70 so that as the shaft 36 revolves, centrifugal force tends to move these weights from the position shown in Figs. 1 and 18 to the position shown in Fig. 19.

As the weights 80 move outwardly under the influence of centrifugal force, they shorten the effective length of the resilient strips 70 and move the collar 76 and brake disc 78 toward the collar 44. This brake disc is adapted to engage the eccentric brake member 82 (Fig. 3) of felt or other suitable material carried by the rotatable shaft 84 of a rheostat 86 controlling the flow of current to the motor 34. The brake member 82 is clamped between a pair of metal washers 88, and the assembly comprising these washers and the brake member is clamped against a shoulder 90 of the rheostat shaft by means of a nut 92 screwed to the threaded upper end of this shaft (Fig. 3).

The rheostat 86 comprises a sheet metal casing suitably secured to the tubular housing 30 and containing a resistance 94 in series with the motor field coil 96 (Fig. 13). A slider 98 is carried by the shaft 84 and moves over the resistance 94 to vary the supply of current to the motor field coil. The rheostat shaft 84 is rotated by a knob 100 secured to the outer end of the shaft 84 by a screw 102 and serves simultaneously to vary the motor speed and to adjust the eccentric governor brake member 82 to condition the governor to maintain the desired speed of the shaft 36.

The speed indicating mechanism includes a collar 104 secured by a screw 106 to the left-hand end of the motor shaft 36, as most clearly shown in Figs. 1 and 5. This collar forms a support for a permanent magnet 108 having two north and two south poles, as clearly shown in Fig. 9. The collar 104 has a shoulder 110 forming an abutment for a washer 112 and one or more shims 114 may be interposed between the magnet 108 and the washer 112 to adjust the position of the magnet axially of the collar 104. The magnet is held in place by a ring 116 secured to the collar 104 by a screw 118. The magnet 108 rotates in the right-hand end of a tubular field piece 120 adjustably threaded in a supporting ring 122. The field piece 120 is composed of magnetic material, whereas the collar 104 and ring 116 are preferably formed of non-magnetic material.

The ring 122 is attached by screws 124 to the flange of a cup 126 whose base is attached in any suitable manner to the adjacent end of the motor 34. The annular field piece 120 may be adjusted relative to the magnet 108 by rotating a shaft 128 having teeth 130 engaging complementary teeth 132 integral with the left-hand end of the field piece 120. The shaft 128 has a hollow right-hand end surrounding a guide bearing 134 riveted to the ring 122 and is rotatably mounted in supporting partitions 136 and 138 hereinafter described in greater detail. The left-hand end of the shaft 128 is provided with a screwdriver slot 140 to permit rotation of this shaft and adjustment of field piece 120. Shaft 128 is held in adjusted position by spring wire 141 having one end soldered to partition 138, as indicated at 143 in Fig. 6. The other end of wire 141 has a loop 145 which may be engaged by a hook to remove the wire from slot 140 during adjustment of shaft 128 and thereafter to replace the wire in this slot.

Rotation of the magnet 108 tends to rotate a non-magnetic speed cup 142 mounted on an indicator shaft 144. One end of this shaft 144 is journalled in a jeweled bearing 146 carried by a fixed, non-magnetic cup 148 attached by means of rivets 150 and spacing sleeve 152 to the base of the cup 126. The indicator shaft 144 is supported in a second jeweled bearing 154 carried by the plate 138. The extreme left-hand end of the shaft 144 carries a pointer 156 movable over a graduated dial 158 visible through the glass window 160 of a cover 162 removably attached to the left-hand end of the tubular housing 30 by means of screws 164.

Partition 136 is secured to the rim of cup 126 by short posts 165 and screws 167. Longer posts 166 are also mounted on the rim of the cup 126 and support partition 138 and dial 158. Partition 138 is clamped by nuts 168 against shoulders provided by posts 166, and dial 158 is secured to the ends of these posts by screws 170 and washers 172. Dial 158 is provided with an opening 174 opposite the end of shaft 128 to provide access to this shaft and spring wire 141 when the cover 162 is removed so that the shaft may be rotated to adjust the field piece 120 relative to the magnet 108.

A collar 176 is attached to the indicator shaft 144 for rotation therewith and has teeth 178 engaging the teeth of a gear 180 mounted on a secondary indicator shaft 182. This secondary shaft is mounted in jeweled bearings 184 and 186. The bearing 184 is mounted in a bracket 188 attached to cup 126, and the bearing 186 is mounted in an offset portion 190 of partition 138. Shaft 182 has attached thereto an auxiliary indicator disc 192 having indicia suitably marked thereon and intended to be moved into registry with an arcuate opening 194 in the dial 158. The indicator shafts 144 and 182 are urged toward zero position by a spiral spring 196 having one end attached to a collar 198 mounted on shaft 182, and a second end attached to a fixed stop 200 (Fig. 7) attached to the partition 138. The stop 200 has a bent-over end 202 adapted to be engaged by the bent-over portion 204 of a strip 206 movable with gear 180 and shaft 182.

In use, the stroboscope is pointed toward the shaft or other moving object whose speed is to be indicated, and the operator looks through the windows 54 and 66 while he adjusts the manual control button 100 of the rheostat to vary the motor speed and bring the window or windows of one band of the scanning disc into synchronism with the shaft or other moving part. Rotation of the permanent magnet 108 creates a drag on speed cup 142 proportional to the speed of the shaft 36 on which the scanning disc is mounted. Rotation of speed cup 142 under the influence of this drag is resisted by spiral spring 196, but the speed cup and shafts 144 and 182 driven therefrom rotate to cause pointer 156 and indicator disc 192 to assume positions accurately reflecting the speed of shaft 36 and of the scanning disc carried thereby. When a particular band of the scanning disc is in synchronism with the rotating part whose speed is being checked, the operator may glance at pointer 156 and indicating disc 192 to see the reading thereof.

I have found it more convenient, however, to provide means for locking this pointer and indicating disc in fixed position as soon as a particular band of the scanning disc is brought into synchronism with the rotating part being measured, as this gives the operator more time to view and read the indicating means accurately. Referring to Fig. 5, it will be noted that the collar 176 attached to the speed cup shaft 144 carries a brake drum 208 adapted to be engaged by a brake shoe 210 of felt or other suitable material. As best shown in Fig. 8, the brake shoe 210 is mounted on a resilient arm 212 attached at 214 to the partition 136. A spring 216 is interposed between the arm 212 and a fixed support 218 provided by partition 136 and urges the brake shoe 210 toward the brake drum 208. The brake shoe is withdrawn from engagement with the brake drum by an electromagnet 220 which attracts an armature 222 attached to the arm 212.

I have provided latch means which normally holds the brake shoe 210 in retracted position. This latch means comprises a second resilient arm 224 mounted on the partition 136 as indicated at 226. The arm 224 has a slot 228 adapted to receive the tongue 230 formed by the extreme left end or free end of the arm 212. When the free end of the brake carrying arm 212 is retracted by electromagnet 220, the tongue 230 of this arm moves opposite the slot 228 in arm 224 whereupon this latter arm is moved to the right by a spring 232 confined between this arm and a fixed support 234 provided by the partition 136. Engagement of the tongue 230 in the slot 228 serves to hold the brake shoe 210 in retracted or inoperative position until the latch is released by a second electromagnet 236 mounted on the partition 136 and operative to attract an armature 238 attached to the free end of the latch arm 224. When the upper end of latch arm 224 is drawn to the left by magnet 236, tongue 230 passes out of slot 228 and spring 216 applies the brake shoe 210.

Application and release of the indicator brake are controlled by switch mechanism operated by a trigger 240 associated with the piston grip 32. This switch mechanism is best shown in Figs. 10, 11 and 12, and comprises a slide or actuator 242 to which the trigger 240 is attached by a screw 244. The actuator 242 has a slot 246 receiving a guiding and retaining pin 248 and a shaft 250 both carried by a support 252 attached to the grip 32 by screws 254. The actuator 242 and trigger 240 are urged toward the right by a spring 256 confined between the left-hand end of the actuator and an opposed end of the support 252.

A ratchet wheel 258 is affixed to the shaft 250 and is given a step by step rotation by a resilient pawl 260 carried by the actuator 242. Retrograde movement of the ratchet wheel 258 and shaft 250 is prevented by a resilient pawl 262 attached to the support 252. A switch operating wheel 264 is also affixed to the shaft 250 and serves to control a pair of switches indicated generally by reference characters A and B which control electromagnets 236 and 220 respectively.

As clearly shown in Fig. 11, the switch A comprises switch arms 266 and 268 suitably mounted in a bracket 270 of the support 252 and properly insulated therefrom. The switch B likewise comprises switch arms 272 and 274 also supported from the bracket 270 and insulated therefrom. Switch arm 268 is positioned just to the left of the switch operating wheel 264 and is adapted to be engaged by lateral projections 276 formed on one side of this wheel. Such engagement moves the upper end of switch arm 268 to the left to bring the contact carried by this end into engagement with the contact carried by the upper end of switch arm 266 with resultant supply of current to the electromagnet 236. This magnet releases a latch which results in application of the brake shoe 210 so that the switch A controls application of the indicator brake.

Arm 274 of switch B has its upper end lying just to the right of actuating wheel 264 and is adapted to be engaged by projections 278 extending laterally from the right-hand side of this wheel. Such engagement causes the contact at the upper end of arm 274 to engage the contact at the upper end of the arm 272 and supplies current to the brake release magnet 220 to withdraw brake shoe 210 from engagement with brake drum 208. It is thus apparent that switch B controls release of the indicator brake. It is only necessary to energize the magnets 220 and 236 momentarily in order to control the application and release of the indicator brake and the projections 276 and 278 are so arranged that they engage their respective switches only during the midstroke of the trigger 240 and actuator 242.

As clearly shown in the drawings, the projections 276 and 278 are arranged alternately about the circumference of the actuator wheel 264 and are so spaced that only one of these projections engages a switch for each complete stroke of the trigger 240 and actuator 242. This means that when the trigger is first operated, it energizes the latch release magnet 236 to apply the indicator brake. Upon release of pressure on the trigger 240, retractor spring 256 returns the trigger and actuator to initial position. When it is desired to release the indicator brake, the operator again presses on the trigger 240, whereupon the switch B of the brake release magnet 220 is momentarily closed and the brake shoe is withdrawn to inoperative position and is held in this position by the mechanical latch mechanism. As soon as finger pressure is released, the trigger 240 and actuator 242 are again returned to extended position by spring 256.

From the foregoing, it will be apparent that the switches for controlling the indicator brake mechanism cannot be maintained in closed position for any appreciable length of time unless the operator deliberately abuses the stroboscope by holding the trigger in intermediate position. This is an important feature of my invention as it protects the electromagnets against overheating and the battery against unnecessary drains.

In Fig. 13, I have shown a wiring diagram wherein the source of current is indicated as a battery 300 connected by suitable wires and through suitable brushes to the motor armature 302. This battery is also connected to the motor field coil 96 by way of the rheostat comprising the resistance 94 and slider 98. The battery 300 also furnishes current to the electromagnets 220 and 236 by way of the trigger controlled switches A and B. While I have shown and described my portable stroboscope as being supplied with current from a battery, any other suitable source of current may be utilized in lieu of this battery.

In Figs. 22 and 23, I have shown a modified form of my invention which is identical with that previously described except that the return spring for the indicating mechanism is mounted on the main indicating shaft instead of on the auxiliary shaft. In the embodiment of Figs. 22 and 23, a large spiral return spring 350 has one end attached to a collar 352 on the speed cup shaft 144' and the other end of this spring is wrapped around one of the partition supporting posts 165. Discs 354 and 356 are attached to the collar 352 on opposite sides of the spring 350 and limit lateral movement of this spring. Since these discs rotate with speed cup shaft 144', frictional resistance created by engagement of these discs with the spring 350 is minimized and has no effect on the reading of the indicating mechanism.

I contemplate that my portable stroboscope will be used by an operator who walks about a factory to determine the rotating speed of various shafts or other moving parts of the several machines installed in the factory. For such purposes the operator would carry a case strapped to his back and the flexible electric cord 357 of the portable stroboscope would be provided with a terminal which could be inserted in and removed from a suitable socket provided by the carrying case. This carrying case would preferably contain a suitable battery, such as a 6 volt D. C. battery, and a selenium rectifier for converting 110 alternating current into 6 volt direct current. A switch would be provided so that the socket would be connected with either the battery or rectifier and the rectifier, of course, would be in circuit with a long, flexible cord which could be plugged into the lighting system of the factory.

Such an arrangement would have the advantage of permitting the use of alternating current whenever this current were readily available. The battery would be conserved by being used only when a suitable source of alternating current is not available or when the operator is moving rapidly from one machine to another and it is not convenient to plug into an alternating current source.

In some instances it may be desirable to make a prolonged study of a particular machine and in such instances it is, of course, preferable to utilize the lighting system of the factory as a source of current. In such prolonged studies it may also be desirable to mount the stroboscope on a suitable support, such as a camera tripod, and for this purpose I have provided the base of the handle with a socket 358 which may be readily secured to the usual camera tripod. The carrying case containing the battery and rectifier may also serve as a storage receptacle for the additional scanning discs.

It will be understood, however, that the foregoing paragraphs refer only to a few of the numerous uses to which my portable stroboscope may be put. It is not necessary that the stroboscope be operated by a 6 volt direct current motor, as any other type of motor may be used in lieu thereof. The carrying case to which I have reference constitutes only one of several advantageous arrangements for supplying current to the stroboscope and any other suitable arrangement may be provided.

When the operator wishes to determine the speed of a shaft, he points the portable stroboscope at the shaft just as he would a pistol, and sights through the windows aligned on opposite sides of the scanning disc. If none of the four bands of the scanning disc happens to be in synchronism with the shaft at which the stroboscope is pointed, the operator adjusts the knob 100 of the rheostat in an effort to bring one of these scanning bands into synchronism with the shaft. If no band of the particular scanning disc in the stroboscope can be brought into synchronism with the shaft, the operator stops the stroboscope and replaces the particular scanning disc therein with another scanning disc, and repeats the operation.

As soon as one band of the scanning disc is brought into synchronism with the shaft, i. e., as soon as the clear segments of this band move past the sighting windows with such speed as to make the shaft appear to stand still, the operator presses on the trigger 240 to set the indicator brake. The operator can then lower the stroboscope to bring the indicators into a position where they may be more easily read. After he has read the indicators he returns the stroboscope to sighting position and again sights on the shaft to ascertain that the particular band of the scanning disc is still in synchronism with the shaft, and that the indicator reading therefore correctly reflects the speed of this shaft.

If this check shows that the indicator reading is correct, the operator presses the trigger to release the indicator brake and passes on to the next machine whose speed is to be determined. If, however, the check sight shows that the scanning band is no longer in synchronism with the shaft whose speed it is sought to determine, the operator presses the trigger to release the indicator brake, adjusts the rheostat to bring the particular scanning band into synchronism with the shaft, presses the trigger to apply the indicator brake, reads the indicator, and makes a further check sight.

In order to make the indicating means easier to read, this means is so constructed that the indicator shaft 144 and pointer 156 can rotate through four complete revolutions when the scanning disc is brought up to maximum speed. Each revolution of the indicator shaft 144 moves the auxiliary indicating shaft 182 through a quarter of a revolution and causes a different number on the dial 192 to show through the window 194, and thereby indicate the number of complete revolutions of the pointer 156. In Fig. 6 the pointer 156 and dial 192 are shown in the zero position. As the scanning disc shaft is brought up to one thousand R. P. M., the pointer 156 makes one complete rotation and the dial 192 moves so that number 1 appears through the opening 194. For example, if the scanning disc shaft had a speed of 1500 R. P. M., the pointer 156 would point at the number 5 on the big dial 158, and the movable dial 192 would shift so that the figure 1 appears through the opening 194.

If the band of the scanning disc which is in synchronism with the shaft being measured has only a single clear segment or window, the shaft being measured would then have a speed of 1500 R. P. M. On the other hand, if the band of the scanning disc which is in synchronism with the shaft being measured has a plurality of clear segments, the speed shown by the indicating mechanism must be multiplied by the number of clear segments of this particular scanning band. In this particular application the three scanning discs shown in Figs. 14, 15 and 16 have bands with clear segments varying in number from 1 to 16, so that with the highest band of the highest scanning disc it would be necessary to multiply the indicator showing by 16 in order to obtain the speed of the shaft or other part being measured.

On each scanning disc that band having the lowest number of windows is closest to the hub of the disc so that the radial position of the particular scanning band being utilized will readily indicate the number of windows in this band provided that the operator knows which disc is in the machine. Special indicating means could readily be provided to indicate which of the three discs is in use, but such means would ordinarily constitute an unnecessary refinement since the operator can check his memory as to which disc is being used by merely examining the two discs not in use.

While I have illustrated and described only two embodiments of my invention, numerous other variations and modifications may be made therein without departing from the scope of my invention, which includes all variations, modifications and equivalents coming within the appended claims.

I claim:

1. A portable stroboscope of the class described, comprising a pistol-like frame adapted to be pointed with its lengthwise axis in substantial alignment with an object to be viewed, a motor carried by said frame, a drive shaft driven by said motor, a scanning disc mounted on said drive shaft transversely of said axis, a governor for said drive shaft, means for varying the speed permitted by said governor, a rheostat for varying the speed of said motor, a common control for said rheostat and said governor varying means, an indicator for indicating the speed of said drive shaft, said indicator being in a plane parallel with said disc, said frame having a part extending laterally beyond said indicator, said part being provided with a window aligned with a part of said scanning disc whereby said scanning disc may be viewed by sighting lengthwise of said frame, a brake for locking said indicator in speed indicating position, and a trigger for setting and releasing said indicator brake.

2. A portable stroboscope of the class described, comprising a pistol-like frame adapted to be pointed with its lengthwise axis in substantial alignment with an object to be viewed, a motor carried by said frame, a drive shaft driven by said motor, a scanning disc mounted on said drive shaft transversely of said axis, a governor for said drive shaft, means for varying the speed permitted by said governor, a rheostat for varying the speed of said motor, a common control for said rheostat and said governor varying means, an indicator for indicating the speed of said drive shaft, said indicator being in a plane parallel with said disc, said frame having a part extending laterally beyond said indicator, said part being provided with a window aligned with a part of said scanning disc whereby said scanning disc may be viewed by sighting lengthwise of said frame and a brake for locking said indicator in speed indicating position.

3. A portable stroboscope of the class described, comprising a pistol-like frame adapted to be pointed with its lengthwise axis in substantial alignment with an object to be viewed, a motor carried by said frame, a drive shaft driven by said motor, a scanning disc mounted on said drive shaft transversely of said axis, a governor for said drive shaft, means for varying the speed permitted by said governor, means for varying the speed of said motor, a common control for said two last named means, an indicator for indicating the speed of said drive shaft, said indicator being in a plane parallel with said disc, said frame having a part extending laterally beyond said indicator, said part being provided with a window aligned with a part of said scanning disc whereby said scanning disc may be viewed by sighting lengthwise of said frame, a brake for locking said indicator in speed indicating position, and means for setting and releasing said indicator brake.

4. A portable stroboscope of the class described, comprising a pistol-like frame adapted to be pointed with its lengthwise axis in substantial alignment with an object to be viewed, a motor carried by said frame, a drive shaft driven by said motor, a scanning disc mounted on said drive shaft transversely of said axis, a governor for said drive shaft, an indicator for indicating the speed of said drive shaft, said indicator being in a plane parallel with said disc, said frame having a part extending laterally beyond said indicator, said part being provided with a window aligned with a part of said scanning disc whereby said scanning disc may be viewed by sighting lengthwise of said frame, a brake for locking said indicator in speed indicating position, and a trigger for setting and releasing said indicator brake.

5. A portable stroboscope of the class described, comprising a frame having a longitudinal axis, a motor, a drive shaft driven by said motor, a scanning disc mounted on said shaft transversely of said axis, a rheostat for varying the speed of said motor, said rheostat including a slider, a shaft for moving said slider, and a handle for rotating said shaft, a speed governor for said shaft comprising a collar attached to said shaft, a second collar slidable axially of said shaft, and weights attached to said collars and effective to vary the position of said slidable collar, an eccentric brake mounted on said rheostat shaft and engageable with said slidable collar to vary the speed control effected by said governor, said frame being pistol-like and supporting said motor, shaft, scanning disc and rheostat, and speed indicating means carried by said frame for indicating the speed of said drive shaft, said indicator being in a plane parallel with said disc, said frame having a part extending laterally beyond said indicator, said part being provided with a window aligned with a part of said scanning disc whereby said scanning disc may be viewed by sighting lengthwise of said frame, said scanning disc having a part laterally offset with respect to said indicating means.

6. A portable stroboscope of the class described, comprising a tubular housing, a motor carried by and within said housing, a drive shaft in axial alignment of the housing and driven by said motor, a scanning disc carried by said drive shaft, said disc being arranged transversely of said tubular housing, means for viewing an object through said scanning disc axially of the housing, a permanent electromagnet mounted on said drive shaft, a first indicating shaft, a speed cup carried by said indicating shaft, a second indicating shaft geared to said first indicating shaft, indicating means mounted on each of said indicating shafts, both indicating means being parallel to said scanning disc, a spiral spring having one end attached to said second indicating shaft and a second end fixed to said housing for urging said indicating shafts and speed cup to zero position, a brake drum mounted on said first indicating shaft, a brake shoe engageable with said brake drum, a first electromagnet for retracting said brake shoe, a latch to hold said brake shoe in retracted position, a spring for applying said brake shoe, a second electromagnet for withdrawing said latch, a trigger movably mounted in said housing, a switch operating wheel driven by said trigger, a normally open electromagnet switch on each side of said wheel, projections extending alternately from opposite sides of said wheel for temporarily closing said switches, said projections and switches being so constructed and arranged that only one switch is closed for each actuation of said trigger, and an electrical connection between each switch and one of said electromagnets.

7. A portable stroboscope of the class described, comprising a housing, a motor carried by said housing, a drive shaft driven by said motor, a scanning disc carried by said drive shaft, a permanent electromagnet mounted on said drive shaft, an indicating shaft driven by said drive shaft, a brake drum mounted on said indicating shaft, a brake shoe engageable with said brake drum, a flexible arm supporting said brake shoe, a first electromagnet for retracting said brake shoe, a latch engageable with said flexible arm to hold said brake shoe in retracted position, a spring for applying said brake shoe, a second electromagnet for withdrawing said latch, a pistol-like grip attached to said housing, a trigger movably mounted in said grip, a spring for urging said trigger in one direction, a switch operating wheel driven by said trigger, a normally open electromagnet switch on each side of said wheel, projections extending alternately from opposite sides of said wheel for temporarily closing said switches, said projections and switches being so constructed and arranged that only one switch is closed for each actuation of said trigger, and an electrical connection between each switch and one of said electromagnets.

8. A portable stroboscope of the class described, comprising a housing, a motor carried by said housing, a drive shaft driven by said motor, a scanning disc carried by said drive shaft, a permanent electromagnet mounted on said drive shaft, a first indicating shaft, a speed cup carried by said indicating shaft, a second indicating shaft geared to said first indicating shaft, indicating means operated by each of said indicating shafts, a spiral spring having one end attached to said second indicating shaft and a second end fixed to said housing for urging said indicating shafts and speed cup to zero position, a brake drum mounted on said first indicating shaft, a brake shoe engageable with said brake drum, a flexible arm supporting said brake shoe, a first electromagnet for retracting said brake shoe, a latch engageable with said flexible arm to hold said brake shoe in retracted position, a spring for applying said brake shoe, a second electromagnet for withdrawing said latch, a pistol-like grip attached to said housing, a trigger movably mounted in said grip, a pair of normally open electromagnetic switches operated alternately in response to successive actuations of said trigger to control said electromagnets, and means for causing said trigger to actuate said switches alternately.

9. A portable stroboscope of the class described, comprising a housing, a motor carried by said housing, a drive shaft driven by said motor, a scanning disc carried by said drive shaft, a permanent magnet mounted on said drive shaft, indicating means driven from said shaft, a brake drum mounted on said indicating means, a brake shoe engageable with said brake drum, a flexible arm supporting said brake shoe, means for withdrawing said brake shoe, a latch engageable with said flexible arm to hold said brake shoe in retracted position, a spring for applying said brake shoe, means for withdrawing said latch, a pistol-like grip attached to said housing, a trigger movably mounted in said grip, a slidable actuator connected to said trigger, a spring for urging said actuator and trigger in one direction, a pawl carried by said actuator, a switch operating wheel driven by said pawl, a normally open electromagnet switch on each side of said wheel, projections extending alternately from opposite sides of said wheel for temporarily closing said switches, said projections and switches being so constructed and arranged that only one switch is closed for each actuation of said trigger, and an electrical connection between each switch and one of said withdrawing means.

10. A portable stroboscope of the class described, comprising a housing, a motor carried by said housing, a drive shaft driven by said motor, a scanning disc carried by said drive shaft, a permanent magnet mounted on said drive shaft, an indicating shaft, a speed cup carried by said indicating shaft, indicating means operated by said indicating shaft, a spiral spring having one end attached to said indicating shaft and a second end fixed to said housing for urging said indicating shaft and speed cup to zero position, a brake drum mounted on said indicating shaft, a brake shoe engageable with said brake drum, a flexible arm supporting said brake shoe, a first electromagnet for retracting said brake shoe, a latch engageable with said flexible arm to hold said brake shoe in retracted position, a spring for applying said brake shoe, a second electromagnet for withdrawing said latch, a grip attached to said housing, a trigger movably mounted in said grip, a slidable actuator connected to said trigger, a spring for urging said actuator and trigger in one direction, a pawl carried by said actuator, a switch operating wheel driven by said pawl, a normally open electromagnet switch on each side of said wheel, projections extending alternately from opposite sides of said wheel for temporarily closing said switches, said projections and switches being so constructed and arranged that only one switch is closed for each actuation of said trigger, and an electrical connection between each switch and one of said electromagnets.

11. A portable stroboscope of the class described, comprising a housing, a motor carried by said housing, a drive shaft driven by said motor, a scanning disc carried by said drive shaft, a permanent magnet mounted on said drive shaft, a first indicating shaft, a speed cup carried by said indicating shaft, a second indicating shaft geared to said first indicating shaft, indicating means operated by each of said indicating shafts, a spiral spring having one end attached to said second indicating shaft and a second end fixed to said housing for urging said indicating shafts and speed cup to zero position, a brake drum mounted on said first indicating shaft, a brake shoe engageable with said brake drum, a flexible arm supporting said brake shoe, a first electromagnet for retracting said brake shoe, a latch engageable with said flexible arm to hold said brake shoe in retracted position, a spring for applying said brake shoe, a second electromagnet for withdrawing said latch, a pistol-like grip attached to said housing, a trigger movably mounted in said grip, a slidable actuator connected to said trigger, a spring for urging said actuator and trigger in one direction, a pawl carried by said actuator, a switch operating wheel driven by said pawl, a normally open electromagnet switch on each side of said wheel, projections extending alternately from opposite sides of said wheel for temporarily closing said switches, said projections and switches being so constructed and arranged that only one switch is closed for each actuation of said trigger, and an electrical connection between each switch and one of said electromagnets.

FREDERICK G. SCHWEISTHAL.

REFERENCES CITED

The following references are of record in the file of this patent:

UNITED STATES PATENTS

| Number | Name | Date |
|---|---|---|
| 1,930,460 | Boulin | Oct. 17, 1933 |
| 2,148,794 | Ashdown | Feb. 28, 1939 |

FOREIGN PATENTS

| Number | Country | Date |
|---|---|---|
| 659,685 | France | Feb. 5, 1929 |
| 516,626 | Great Britain | Jan. 8, 1940 |

Certificate of Correction

April 26, 1949.

Patent No. 2,468,690.

FREDERICK G. SCHWEISTHAL

It is hereby certified that error appears in the printed specification of the above numbered patent requiring correction as follows:

Column 6, line 15, for the word "piston" read *pistol*; and that the said Letters Patent should be read with this correction therein that the same may conform to the record of the case in the Patent Office.

Signed and sealed this 8th day of November, A. D. 1949.

[SEAL]

THOMAS F. MURPHY,
*Assistant Commissioner of Patents.*